United States Patent [19]

Cohen

[11] Patent Number: 4,780,347

[45] Date of Patent: * Oct. 25, 1988

[54] PIPE INSULATION FOR COLD WEATHER APPLICATIONS

[75] Inventor: Lewis S. Cohen, Hingham, Mass.

[73] Assignee: Venture Tape Corp., Rockland, Mass.

[*] Notice: The portion of the term of this patent subsequent to Jun. 17, 2003 has been disclaimed.

[21] Appl. No.: 804,066

[22] Filed: Dec. 3, 1985

Related U.S. Application Data

[63] Continuation-in-part of Ser. No. 658,120, Oct. 5, 1984, Pat. No. 4,595,615.

[51] Int. Cl.⁴ .................. B32B 27/36; C09J 7/02; C09J 7/04; F16L 9/14
[52] U.S. Cl. .................. 428/36; 138/149; 138/151; 138/155; 138/170; 138/DIG. 1; 138/DIG. 2; 156/304.3; 156/327; 427/379; 427/388.5; 428/40; 428/61; 428/335; 428/339; 428/341; 428/344; 428/354; 428/355; 428/906
[58] Field of Search .......... 138/149, 151, 155, DIG. 1, 138/DIG. 2; 156/304.3, 327; 427/379, 388.5; 428/36, 40, 61, 335, 339, 341, 344, 354, 355, 906

[56] References Cited

U.S. PATENT DOCUMENTS

| | | | |
|---|---|---|---|
| 3,497,383 | 2/1970 | Olyphant et al. | 428/209 |
| 3,876,454 | 4/1975 | Smell et al. | 428/355 |
| 3,993,833 | 11/1976 | Esmay | 428/351 |
| 4,022,248 | 5/1977 | Hepnar | 428/40 |
| 4,060,664 | 11/1977 | McGiure et al. | 428/480 |
| 4,243,453 | 1/1981 | McClintock | 428/40 |
| 4,513,039 | 4/1985 | Esmay | 428/355 |
| 4,522,870 | 6/1985 | Esmay | 428/345 |
| 4,595,615 | 6/1986 | Cohen | 428/335 |

Primary Examiner—James C. Cannon
Attorney, Agent, or Firm—Wolf, Greenfield & Sacks

[57] ABSTRACT

An insulation system for pipes which includes segments of fiberglass insulation or other mineral fiber slit along their length for surrounding the pipe, a butt strip tape for sealing abutting ends of the segments of insulation, and means for sealing a flap on the insulation segment covering the slit after the pipe has been inserted therethrough. The butt strip tape is a laminated tape which includes a layer of paper, a layer of fiberglass, a layer of foil and a pressure sensitive acrylic adhesive. The means for sealing the slit may be either an adhesive film cast on a release liner and applied to the flap or a double sided adhesitve tape. The double sided tape is a laminate which has an adhesive layer on each side of a central, thin substrate. The adhesive used in all instances is an isooctyl acrylate polymer which is approximately a 100% acrylate compound having a solvent content no greater than 0.5%. The adhesive allows the tape to be applied at temperatures ranging frong $-17°$ F. to $158°$ F.

27 Claims, 3 Drawing Sheets

PIPE INSULATION FOR COLD WEATHER APPLICATIONS

CROSS REFERENCE TO RELATED APPLICATION

This application is a continuation-in-part of copending application Ser. No. 658,120 filed Oct. 5, 1984 now U.S. Pat. No. 4,595,615.

FIELD OF THE INVENTION

This invention relates generally to pipes and insulation therefor, and more particularly to fiberglass insulation and adhesives and adhesive tapes therefor which can be used in cold weather.

BACKGROUND OF THE INVENTION

Pipes which are used in dwellings, in commercial buildings or in industrial plants and carry steam for steam heat, hot water, cold water, chemicals or petroleum products and the like, are generally provided with an exterior layer of insulation. Such pipes may be formed of copper, steel, aluminum, plastic, rubber or other like materials. This exterior layer of insulation frequently comprises an elongated fiberglass jacket which is wrapped about the pipe. Each such jacket includes a slit extending in the direction of elongation of the jacket through which the pipe may be inserted. A flap which generally forms an extension of the outer layer of the pipe is used to seal the slit. This flap is generally provided with an adhesive layer or tape which seals the flap against the outer surface of the jacket to prevent the escape of eeat and moisture.

This fiberglass jacket is typically applied in segments which abut one another, thus leaving gaps between the abutting ends of adjacent segments along the length of the pipe through which heat and moisture can escape. These abutting ends of insulation segments are often sealed by the use of tape wrapped around the pipe. During construction of the building, the pipes are often exposed to great extremes of temperature, ranging from far below 0° F. to above 100° F. Such temperature extremes may also be experienced by the pipe after installation of the pipe when the building is occupied and during times that repairs are required.

At present, there exists no tape which is functional much below 32° F. As a result, it is presently impossible to insulate pipes in unheated buildings during the middle of the winter. Severe constraints are placed upon when construction work can be done, or upon when pipes can be repaired or replaced, particularly in cold climates.

SUMMARY OF THE INVENTION

An object of this invention is to provide an insulation system for pipes which can be applied at either very cold or very warm temperatures.

Another object of this invention is to provide an adhesive which can be used in conjunction with pipe insulation and which can be used at either extremely cold or extremely warm temperatures.

The foregoing and other objects of this invention are achieved by a pipe insulation system including segments of fiberglass or other mineral fiber insulation which have a slit along their length and an adhesively secured covering flap and which are adapted to be wrapped around the pipe, and butt strip tape for sealing abutting ends of adjacent segments. Both the butt strip tape and the adhesively secured covering flap are functional at either very cold or very warm temperatures. The fiberglass insulation includes a layer of fiberglass yarn which is surrounded by a paper jacket which is adhesively affixed thereto. The slits in the segments are sealed by the covering flap. The flap is secured to the outer surface of the jacket by a pressure sensitive adhesive layer on the inside of the flap which is initially covered by a release liner. The adhesive layer can be a tape formed either of a central, thin substrate having an adhesive layer disposed on both sides and covered by a release liner, or an adhesive layer cast on a known release liner. The tape or adhesive layer can be applied to the flap either in the factory or at the job site.

The spaces between abutting ends of adjacent segments are sealed by a butt strip tape which is wrapped about the abutting ends of the insulation segments. The butt strip tape is typically a laminate comprised of an outer paper layer, a layer of fiberglass yarn adhered to the outer paper layer by a laminating adhesive, a foil layer secured to the other side of the fiberglass layer by a laminating adhesive, a pressure sensitive acrylic adhesive secured to the foil, and a release paper covering the adhesive.

The pressure sensitive adhesive used for both the butt strip tape and the flap is an isooctyl acrylate polymer which is generally pure except for a standard cross linker. This adhesive remains tacky at temperatures ranging from $-17°$ F. to $+158°$ F. When applied, the pressure sensitive adhesive uses a process in which it is cured typically in a two-zone oven at temperatures of 150° F. and 270° F. and in which the time in each zone is one half to one minute to drive off all but no more than 0.5% of the solvent. The butt strip tape uses adhesive thicknesses in the range of from about 1.5 mils to 2 mils, while the adhesive layer on the flap or the tape used for the flap has an adhesive thickness in the range of from about 2 mils to 5 mils.

BRIEF DESCRIPTION OF THE DRAWINGS

The objects, advantages and features of this invention will be more clearly appreciated from the following detailed description when taken in conjunction with the accompanying drawings in which.

DETAILED DESCRIPTION OF THE PREFERRED EMBODIMENTS

Figure 1:
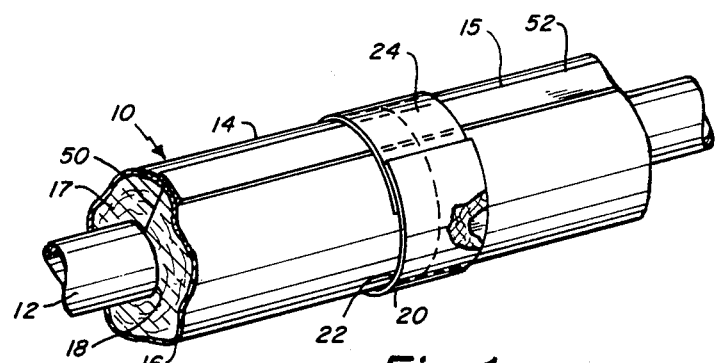
FIG. 1 is a cut away, pictorial view of the insulation system of this invention in conjunction with a pipe.

With reference now to the drawings, and more particularly to FIG. 1 thereof, the insulation system of this invention will be described. FIG. 1 shows a portion of an insulation system 10 installed for insulating a pipe 12. Pipe 12 may be any conventional hot or cold water pipe or steam pipe or pipe for carrying chemicals or petroleum products used in a building, whether a commercial building or a dwelling or an industrial plant. Pipe 12 may be formed of any conventional material, such as copper, steel, a plastic, aluminum or rubber.

Insulation system 10 includes tape 20 and a plurality of abutting insulation segments which are disposed along the length of pipe 12 to seal pipe 12 against the elements. Two exemplary segments 14 and 15 are shown in abutting relationship in FIG. 1. Segments 14 and 15 abut one another at respective ends 22 and 24 and tape 20 is adapted to be wrapped around segments 14 and 15 to seal abutting ends 22 and 24. Segments 14 and 15 are each typically comprised of a flame resistant, vapor barrier material, comprising a flame retardant paper layer 16, a layer 17 of fiberglass yarns, and a metallized layer 18. Typically the kraft paper layer and the metallized layer 18 are secured to opposite sides of the fiberglass layer 17 with a flame resistant laminating adhesive. However, metallized layer 18 can also be disposed between paper layer 16 and layer 17. In this embodiment, the metallized layer 18 and paper layer 16 are laminated together to form a single unit and this unit is secured to layer 17 by a laminating adhesive. The same laminating adhesives may be used for all bonds between the layers. In one embodiment, metallized layer 18 is a layer of aluminum foil with a thickness in the range of 0.00035 to 0.0007 inches. In another embodiment, the metallized layer 18 is an aluminized polyester film of about one half mil thickness.

In a preferred embodiment, paper layer 16 is a high intensity, white, chemically treated kraft paper, and the weight of the paper is in the order of 45 pounds per 3,000 square feet. In a preferred embodiment, layer 17 of fiberglass scrim yarns is a tri-dimensional 5×5 fiberglass. The laminating adhesive used is any conventional flame retardant, thermo-setting adhesive suitable for such uses. Segments 14 and 15 are split along slit 50, and slit 50 is sealed by flap 52 provided on paper layer 16. Flap 52 typically is an extension of layer 16, or if layers 16 and 18 are laminated to form a single unit, flap 52 is an extension of the unit formed by layers 16 and 18.

Figure 2:
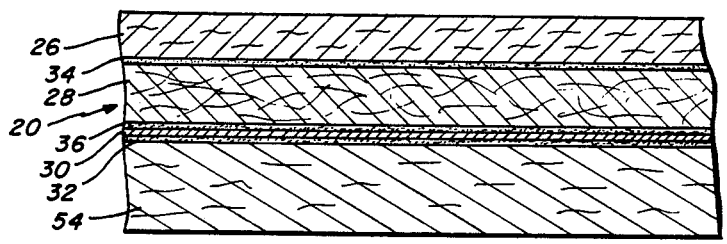
FIG. 2 is a cross sectional view of the tape of the system of FIG. 1.

With reference now to FIG. 2, the structure of tape 20 will be described. In a preferred embodiment, tape 20 is a laminate having about the same structure as that of segments 14 and 15, except that tape 20 includes a thinner fiberglass layer and a pressure sensitive adhesive. However, it is not necessary that tape 20 have the same structure as segments 14 and 15 and other structures are possible. In the preferred embodiment, tape 20 is a laminate as shown in FIG. 2 and includes a layer 26 of paper, a layer 28 of fiberglass, a metallized layer 30, a layer 32 of a pressure sensitive adhesive, and layer 54 of release paper. Paper layer 26 and fiberglass layer 28 are secured together using a laminating adhesive 34, while fiberglass layer 28 and metallized layer 30 are secured together by a laminating adhesive 36. Paper layer 26 preferably is a high intensity, white, chemically-treated kraft paper which is flame-retardant. Fiberglass layer 28 is made of fiberglass yarns, and typically is woven to form either a tri-directional or diamond pattern weave, or a scrim having a square weave, such as a 5×5 scrim. Laminating adhesives 34 and 36 can be any conventional, thermo setting, flame-retardant adhesives which are suitable for laminating fiberglass to paper and to polyester or metal. Layer 30 can be either a layer of aluminum foil, or a layer of metallized polyester film. Typically, if metallized polyester film is used, the metal deposited thereon is aluminum. Release paper layer 54 can be any conventional release paper which is suitable for use with an acrylic adhesive.

In a preferred embodiment, paper layer 26 has a thickness of about 0.0003 inches, fiberglass layer 28 has a thickness of about 0.0004 inches, layer 30 has a thickness in the range of about 0.00035 to 0.0007 inches if layer 30 is an aluminum foil, and layer 54 has a thickness of about 0.0065 inches. If layer 30 is a metallized polyester, the thickness of layer 30 is about one half mil. If layer 30 is a layer of aluminum foil having a thickness less than 0.0005 inches, a barrier coat is used on the side of layer 30 facing laminating adhesive 36 to seal layer 30 against moisture. In a preferred embodiment, the weight of paper layer 26 would be about 45 pounds per 3,000 square feet.

A commercially available, acceptable material which comprises paper layer 26, fiberglass layer 28, and metallized layer 30 can be purchased from Lamtec Corporation, Bartley-Chester Road, Post Office Box 37, Flanders, N.J. 07836 under the product designation 70J All Service Jacketing. Another commercially available, acceptable material can be purchased from Alpha Associates, Inc., 2 Amboy Avenue, Post Office 128, Woodbridge, N.J. 07095 under the product designation Alpha-Temp, Style ASJ/MAR. Another acceptable commercially available material can be purchased from Manville Building Materials Corporation, Ken-Caryl Ranch, Post Office Box 5108, Denver, Colo. 80217 under the product designation Foil Scrim Kraft ASJ.

Figure 5:
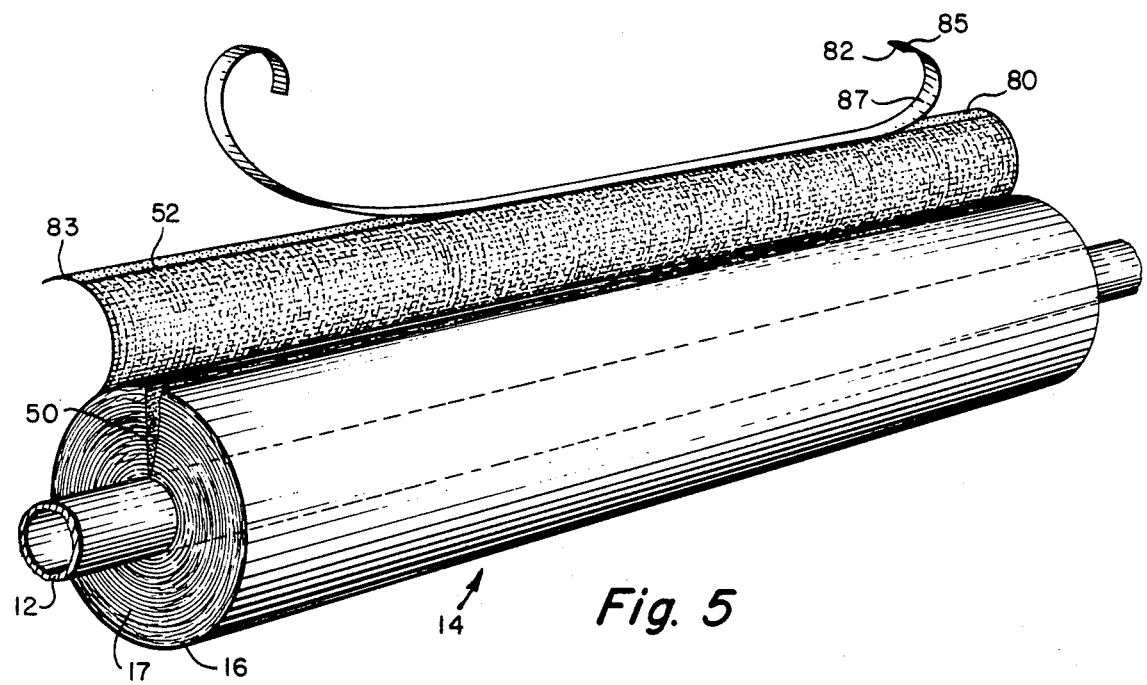
FIG. 5 is a pictorial view of one insulation segment of the system of FIG. 1 showing the covering flap.
Figure 7:
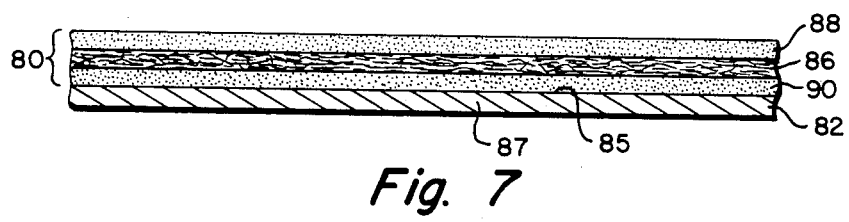
FIG. 7 is a cross-sectional view of another embodiment of the adhesive strip of this invention.
Figure 6:
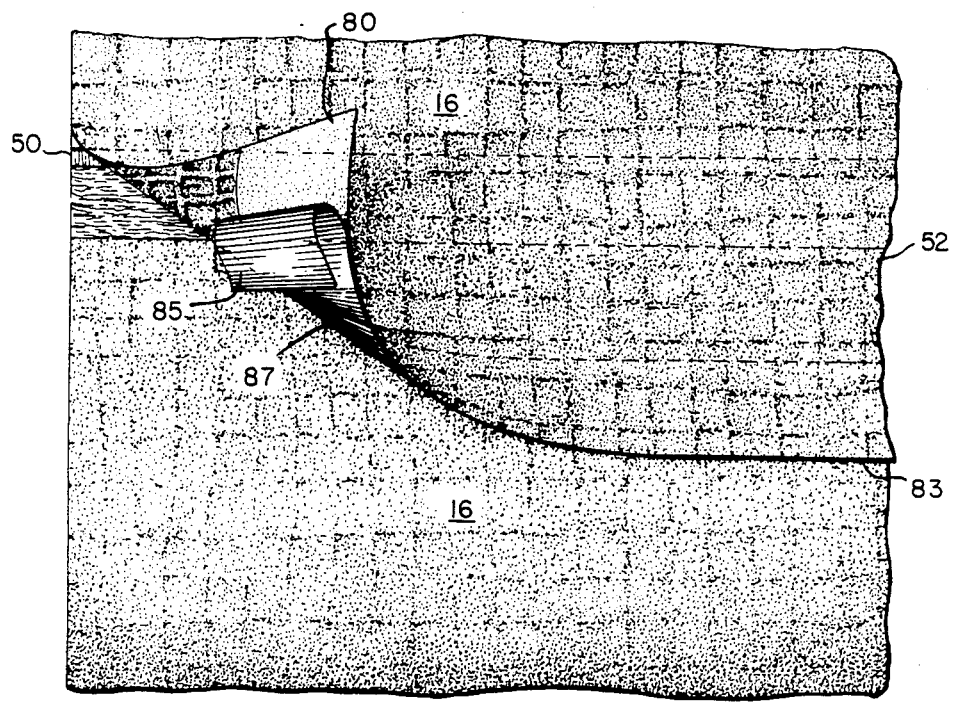
FIG. 6 is a partial view of an insulation segment of FIG. 5 showing the flap in a partially folded over position.

Flap 52 is secured to the outer surface of paper layer 16 by an adhesive strip 80, as shown in FIGS. 5–7. Adhesive strip 80 extends the entire length of flap 52 and also to the outer transverse edge 83 of flap 52. Adhesive strip 80 is covered with a release liner 82 prior to sealing of the flap. Release liner 82 can be any standard release liner, such as a silicone coated paper. Adhesive strip 80 is a pressure sensitive adhesive, as will be described. Flap 52 seals slit 50 to prevent the escape of heat and moisture from pipe 12.

Adhesive layer 32 and strip 80 are both a pressure sensitive acrylic adhesive, preferably an isooctyl acrylate polymer. When cured, adhesive layer 32 and strip 80 approach a 100% acrylate compound in which almost all solvents have been eliminated. However, adhesive layer 32 and strip 80 can tolerate up to 0.5% of solvents after curing and still perform as desired. When cured, adhesive layer 32 typically has a thickness of between 1.5 and 2 mils, and a coating weight of about 1.27 dry ounces per square yard. Adhesive strip 80 typically has a thickness of between 2 mils and 5 mils when cured. The specific gravity of the adhesive in layer 32 and strip 80 is about 0.92, and the Williams Plasticity is about 2.6.

One acceptable, commercially available form of the adhesive modified to form adhesive layer 32 and strip 80 may be purchased from National Starch And Chemical Corporation, Finderne Avenue, Bridgewater, N.J. 08807 under the trademark DURO-TAK, with the product designation 80-1058. When purchased commercially, this adhesive contains 38% by weight of solids with a viscosity of 7,000 CPS. The solvent system of this commercially available adhesive includes 55% ethyl acetate, 17% heptane, 26% isopropyl alcohol, and 2% toluene.

In the preferred method of assembling tape 20, paper layer 26, fiberglass layer 28 and metallized layer 30 are laminated together in a known method using laminating adhesives 34 and 36. Thereafter, the adhesive system in a solvent solution, such as the commercially available DURO-TAK product, is applied directly to layer 30. The adhesive is then cured by passing the entire laminate comprising paper layer 26, fiberglass layer 8, layer 30 and adhesive layer 32 through a multiple zone oven, preferably a two-zone oven. The oven is exhausted so that the pressure therein is below atmospheric. In an exemplary method of preparing the adhesive of this invention, tape 20 is initially introduced in a first zone at ambient temperatures, and the heat is gradually increased until it reaches about 150° F. Typically the travel time of tape 20 through the first zone is in the range of one half minute to one minute. Thereafter, tape 20 is passed to a second zone in the oven in which the temperature is raised to about 270° F. The travel time through the second zone is in the range of one half minute to one minute. If a two-zone oven is used, tape 20 is thereafter removed from the oven. In a three- or four-zone oven, the total residence time is the same, and the temperature is increased from ambient to 270° F. in three or four stages respectively instead of two. This curing process removes solvents in adhesive layer 32 until the solvent level is reduced to no more than 0.5%. As indicated, the resulting composition of adhesive layer 32 is about a 100% acrylate compound. Dwell times and temperatures other than those set forth above may be used to prepare tape 20. The above conditions are only exemplary. The actual times and temperatures are a function of the oven used, the length of the oven, the air flow, amount of heat transfer, and other variables. In fact, any curing process can be used to prepare tape 20 that produces a cured adhesive having no more than 0.5% solvents.

Once adhesive layer 32 has been cured, a layer 54 of conventional release paper is applied to adhesive layer 32. Release paper 38 can be removed by the user when it is desired to apply tape 20 to ends 22 and 24 of segments 14 and 15.

Adhesive strip 80 may be prepared for use in conjunction with segments 14 and 15 in one of three ways. In each of the three embodiments, an isooctyl acrylate polymer adhesive is used which is identical to that used in adhesive layer 32. In the first embodiment, the adhesive is cast in a conventional manner on release liner 82. Release liner 82 typically is a silicone coated differential release paper having a tight release side 85 and an easy release side 87. The adhesive is cast on the side 85 having the tighter release, so that the strip 80 and liner 82 can be provided initially in a roll for application to flap 52. In this embodiment, the adhesive is prepared in a manner identical to that for tape 20. Namely, the adhesive system in a solvent solution, such as the commercially available DURO-TAK product, is applied directly to release liner 82. The adhesive is then cured by passing the coated liner 82 through a multiple zone oven, preferably a two-zone oven. The oven is exhausted so that the pressure therein is below atmospheric. In one exemplary process, liner 82 with the adhesive disposed thereon is initially introduced in a first zone at ambient temperatures, and the heat is gradually increased until it reahhes about 150° F. Typically, the travel time of coated liner 82 through the first zone is in the range of one half minute to one minute. Thereafter, coated liner 82 is passed to a second zone in the oven in which the temperature is raised to about 270° F. The travel time through the second zone is in the range of one half minute to one minute. If a two-zone oven is used, coated liner 82 is thereafter removed from the oven. In a three-zone or four-zone oven, the total residence time is about the same, and the temperature is increased from ambient to 270° F. in three and four stages respectively instead of two. This curing process removes solvents in the adhesive applied to liner 82 until the solvent level is reduced to no more than 0.5%. As indicated, the resulting composition of adhesive is about a 100% acrylate compound, and the thickness of strip 80 when cured is in the range of from about 2 mils to 5 mils. As noted for tape 20, the actual temperatures and dwell times in each zone are a function of the length of the oven used, the air flow, amount of heat transfer, and other variables. Other times and temperatures may be used to produce adhesive layer 80, so long as the resulting cured adhesive has a solvent content of no more than 0.5%.

Once the adhesive has been cured on release liner 82, th composite of strip 80 and liner 82 can be coiled into a roll for storage and later application. Release liner 82 with the adhesive strip 80 disposed thereon can be applied to flap 52 either before lamination of layers 16, 17 and 18, during lamination of layers 16, 17 and 18 or after layer 16 has been laminated onto either fiberglass layer 17 or metallized layer 18. Finally, if desired, the adhesive strip 80 can be provided at the job site as a tape which can then be applied to flap 52 just prior to installation of segments 14 and 15. Since the quick release side 87 of release liner 82 is the exposed side, the roll can be uncoiled without delamination of liner 82 and strip 80. The exposed adhesive surface on release liner 82 is applied directly to the underside of flap 52 in the location shown in FIGS. 5 and 6. When it is desired to secure flap 52 to the outer surface of layer 16, release liner 82 need only be removed to expose the pressure sensitive acrylic adhesive. Flap 52 is then pressed firmly against the outside surface of layer 16 to secure the flap thereto to provide the desired vapor seal.

In a second embodiment, the isooctyl acrylate polymer adhesive strip 80 is again cast on release liner 82 which can be a known silicone coated differential release liner. Again, the adhesive is cast on side 85 having the tighter release. In this embodiment, the adhesive is filled with inert, non-continuous glass fibers, such as chopped strands, to act as a binder to facilitate application and to prevent the adhesive from coming off of the release paper prematurely. The adhesive is applied and cured in identically the same manner as described for the first embodiment for strip 80 in which no glass fibers are used, and the resulting strip 80 has a thickness of from about 2 mils to 5 mils. This embodiment of strip 80 can be applied to flap 52 and used as a roll of tape in the same manner, and at the same time as the first embodiment for strip 80 as described above.

A third embodiment of strip 80 will now be described with particular reference to FIG. 7, and like numbers will be used for like parts, where possible. In this embodiment, the pressure sensitive acrylic adhesive is cast on release liner 82 which against comprises a known silicone coated release paper. A double sided adhesive tape is provided in which an adhesive layer is disposed on both sides of a central substrate. Adhesive layer 80 thus comprises substrate 86 and adhesive layers 88 and 90 disposed opposite sides of substrate 86. This laminate comprising substrate 86 and adhesive layers 88 and 90 is then cast on a release liner 82. Release liner 82 in this embodiment may either have an equivalent or a differential release on opposite sides thereof. Substrate 86 may be any one of several known materials, such as a teabag tissue, a non-woven fabric such as that sold under the trademark CEREX by Monsanto Chemical Co., a thin film such as polyester or polypropylene, or a thin paper such as crepe paper.

In forming the structure shown in FIG. 7, adhesive layers 90 and 88 are first applied to substrate 86 in a known manner. Layers 88 and 90 are formed from the commercially available DURO-TAK product, as previously described. Then, the composite formed of adhesive layers 88 and 90 and substrate 86 is applied to release liner 82. This resulting laminate is then passed through a multiple zone oven to cure the adhesive layers 88 and 90 in the manner previously described or until the solvent level is reduced to 0.5% or less.

Once adhesive layers 88 and 90 have been cured, the resulting strip 80 can be applied directly to flap 52 either before lamination of layers 16, 17 and 18, during lamination thereof, after lamination thereof, or during installation at the site. In any of the foregoing events, adhesive layer 88 is applied directly to the inside surface of flap 52 in the manner shown in FIGS. 5 and 6 to form adhesive strip 80. In this embodiment, the laminate of liner 82 and strip 80 shown in FIG. 7 typically is provided in the form of a roll of tape for application to flap 52 where desired. Release liner 82 may be provided with a differential release on side 85 from that on side 87 in a known manner. Each side 85 and 87 also may have an equivalent release, since either layer 88 or layer 90 can be directly applied to flap 52, and delamination is not a problem when this laminate is provided in a roll or tape form.

Figure 3:
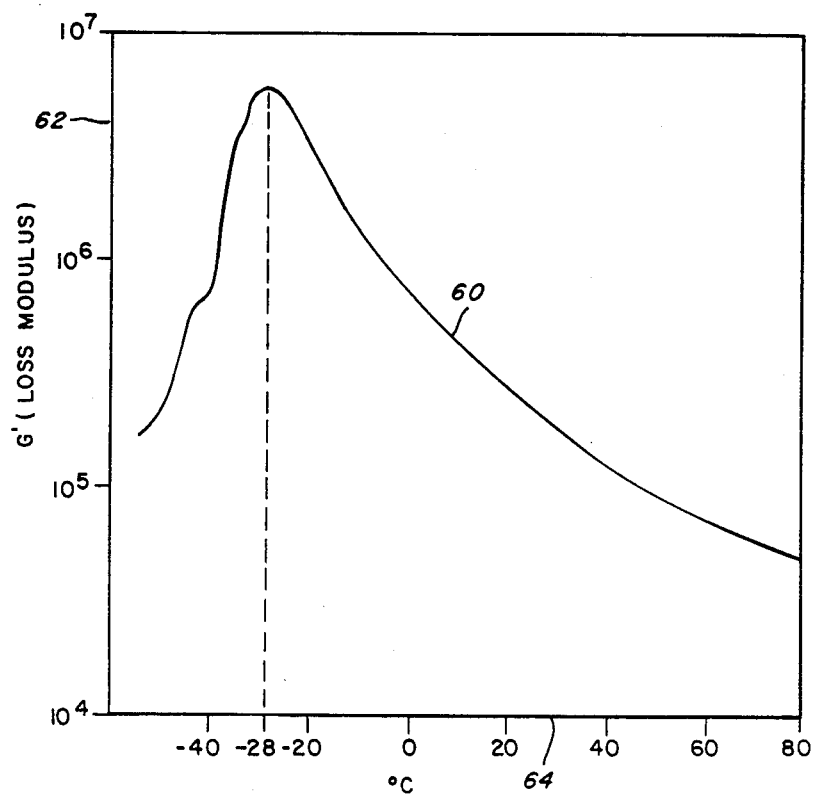
FIG. 3 is a graph showing a plot of the loss modulus versus temperature for the pressure sensitive adhesive of the tape of this invention.
Figure 4:
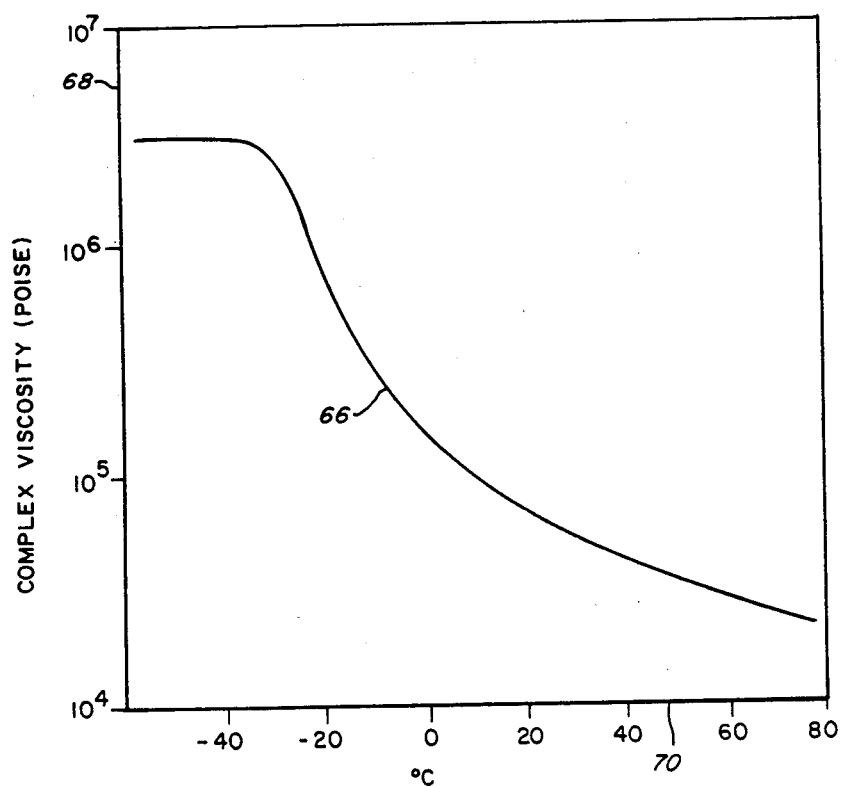
FIG. 4 is a graph showing a plot of complex viscosity versus temperature for the adhesive of the tape of this invention.

Typical characteristics of the adhesive used in adhesive layer 32 and in strip 80 are shown in FIGS. 3 and 4. FIG. 3 shows a plot 60 of the loss modulus 62 of the adhesive as a function of the temperature 64 in degrees Centigrade. The glass transition temperature, or the temperature at which the adhesive acquires a glass-like surface is −28° C. FIG. 4 shows a plot 66 of the complex viscosity 68 in poise of the adhesive as a function of temperature 70 in degrees Centigrade.

By forming both adhesive layer 32 and strip 80 of an isooctyl acrylate polymer which contains no fillers, and which contains no more than 0.5% solvents, adhesive layer 32 and strip 80 both remain tacky and usable down to temperatures as low as −17° F., and thus can be utilized by workers in cold environments. In addition, the adhesive remains tacky up to temperatures as high as 158° F. The suitability of tape 20 and strip 80 for low temperature applications is further enhanced by the thinness of the adhesive layer. Such a thin layer continues to be flexible even at very low temperatures. No other such tape can be used at temperatures much below +25° F. in conjunction with pipe insulation.

In use, insulation segments 14 and 15 are preformed for a particular size pipe 12. Segments 14 and 15 are split at precut slit 50, and are wrapped around pipe 12. As indicated, pipe 12 may be any type of pipe for carrying hot or cold water or steam. Once insulation segments 14 and 15 have been wrapped about pipe 12, if not provided at the factory, a tape comprising strip 80 and release liner 82 is applied to flap 52 along its outer transverse edge, as shown in FIG. 5. Then, release liner 82 is removed, as shown in FIG. 5, and flap 52 is secured to the outer surface of layer 16 by adhesive strip 80 to cover slit 50 to seal segments 14 and 15 about pipe 12 against heat and vapor. Tape 20 is then applied to ends 22 and 24 of segments 14 and 15 to seal the gap therebetween against both heat and vapor. The provision of metallized layer 30, insures a proper vapor seal, while fiberglass layer 28 provides the required insulation against heat loss. Adhesive layer 32 insures that tape 20 is adequately and tightly secured to ends 22 and 24 of segments 14 and 15, and paper layer 26 provides the required covering.

Modifications and improvements will occur within the scope of this invention to those skilled in the art, and the above description is intended as exemplary only. The scope of this invention is defined only by the following claims and their equivalents.

What is claimed is:

1. An insulation system for a pipe comprising:
   a first segment of insulation for being wrapped about a pipe and having a first end;
   a second segment of insulation for being wrapped about a pipe, said second segment of insulation having a first end adjacent to and abutting with said first end of said first segment; and
   tape for sealing the space between said first end of said first segment and said first end of second segment, said tape comprising a layer of pressure sensitive, isooctyl acrylate adhesive disposed on a substrate, said adhesive layer being approximately a 100% acrylate compound and having a solvent content of no greater than one half of one percent.

2. An insulation system as recited in claim 1 wherein said adhesive layer remains tacky in a temperature range from −17° F. to +158° F.

3. An insulation system as recited in claim 1 wherein said adhesive layer has a thickness in the range of about 1.5 to 2.0 mils.

4. An insulation system as recited in claim 1 wherein said adhesive layer has a coating weight of about 1.27 dry ounces per square yard.

5. An insulation system as recited in claim 1 wherein said tape comprises a layer of metallized polyester film.

6. An insulation system as recited in claim 1 wherein said tape comprises a layer of aluminum foil having a thickness in the range of about 0.00035 to 0.0007 inches.

7. An insulation system as recited in claim 1 wherein said tape comprises a barrier coat.

8. An insulation system as recited in claim 1 wherein said tape comprises a fiberglass layer formed of fiberglass yarns.

9. An insulation system as recited in claim 1 wherein said first and said second insulation segments each comprise the following layers:
   a layer of paper;
   a layer of fiberglass yarns; and
   a metallized layer.

10. An insulation system as recited in claim 1 wherein said adhesive layer is formed by a method comprising the steps of:
    applying an isooctyl acrylate polymer adhesive dissolved in a solvent solution to a substrate in a thickness sufficient to produce a coating weight of about 1.27 dry ounces per square yard when cured;
    passing said tape through a first heating zone in which the temperature is gradually raised from ambient temperature to about 150° F., said first passing step having a duration of from about one half to about one minute; and passing said tape through a second heating zone in which the temperature is gradually increased to about 270° F., said second passing step having a duration of from about one half to about one minute.

11. A tape for use with segments of pipe insulation in extreme weather conditions comprising:
   a release liner having differential release characteristics on the two sides thereof; and
   a layer of a pressure sensitive, isooctyl acrylate polymer adhesive disposed on the one side of said release liner having the tighter release, said adhesive being approximately a 100% acrylate compound and having a solvent content of no greater than one half of one percent.

12. A tape as recited in claim 11 wherein said adhesive layer has a thickness in the range of about 1.5 to 2.0 mils, and a coating weight of 1.27 dry ounces per square yard.

13. A tape as recited in claim 11 wherein said adhesive has a Williams plasticity of about 2.6 mm.

14. A tape as recited in claim 11 wherein said adhesive layer remains tacky in a temperature range of from about −17° F. to +158° F.

15. A tape as recited in claim 11 wherein said adhesive layer has a thickness in the range of from about 2 to 5 mils.

16. An insulation system for a pipe comprising:
   an elongated segment of an insulating material for being wrapped about a pipe;
   a central channel disposed along the length of said segment in the direction of elongation of said segment, said channel being adapted to receive a pipe therein;
   a slit extending the length of said segment from an outer surface of said body to said central channel for allowing a pipe to be inserted into said central channel;
   a flap disposed on said segment for sealing said slit;
   a layer of adhesive disposed on said flap for securing said flap to an outer surface of said segment for sealing said slit, said adhesive layer being comprised of a pressure sensitive, isooctyl acrylate adhesive, said adhesive being approximately a 100% acrylate compound and having a solvent content of no greater than one half of one percent.

17. An insulation system as recited in claim 16 wherein said adhesive layer remains tacky in a temperature range of from about −17° F. to +158° F.

18. An insulation system as recited in claim 16 wherein said adhesive layer has a thickness in the range of from about to 2 mils to 5 mils.

19. An insulation system as recited in claim 16 wherein said adhesive comprises inert, non-continuous glass fibers as a binder.

20. An insulation system as recited in claim 16 further comprising a release liner secured to said adhesive layer prior to use.

21. An insulation system as recited in claim 20 wherein said release liner has a differential release on the two sides thereof.

22. An insulation system as recited in claim 16 wherein said adhesive layer is formed by a method comprising the steps of:
   applying an isooctyl acrylate polymer adhesive dissolved in a solvent solution to one side of a silicone coated release liner in a thickness sufficient to produce a coating thickness of about 2 to 5 mils when cured;
   passing the adhesive coated release liner through a first heating zone in which the temperature is gradually raised from ambient temperature to about 150° F., said first passing step lasting from about one half to about one minute; and
   passing said adhesive coated release liner through a second heating zone in which the temperature is gradually increased to about 270° F., said second passing step having a duration of from about one half to about one minute.

23. An insulation system as recited in claim 16 wherein said adhesive layer comprises:
   a thin substrate;
   a first layer of a pressure sensitive, isooctyl acrylate polymer adhesive disposed on one side of said substrate and being adhesively secured to said flap, said first layer of adhesive being approximately a 100% acrylate compound and having a solvent content of no greater than one half of one percent; and
   a second layer of a pressure sensitive, isooctyl acrylate polymer adhesive disposed on the opposite side of said substrate, said second layer of adhesive being approximately a 100% acrylate compound and having a solvent content of no greater than one half of one percent.

24. An insulation system for an elongated pipe comprising:
   insulating material adapted to be wrapped about a pipe, said insulating material having first and second edges which are disposed adjacent one another when said insulating material is wrapped about the pipe; and
   means for securing together said first and said second edges of said insulating material, said securing means comprising:
      a layer of a pressure sensitive, isooctyl acrylate adhesive disposed on a substrate, said adhesive being approximately a 100 percent acrylate polymer compound and having a solvent content of no greater than one half of 1 percent; and
      a layer of release paper normally covering said adhesive layer, said layer of release paper being adapted to be removed from said adhesive layer prior to securing together said first edge and said second edge of said insulating material.

25. An insulation system as recited in claim 24 wherein said adhesive layer remains tacky in a temperature range of from about −17° F. to +158° F.

26. An insulation system as recited in claim 24 wherein said adhesive layer has a thickness in the range of from about 1.5 to 5.0 mils.

27. An insulation system as recited in claim 24 wherein said adhesive layer has a coating weight of about 1.27 dry ounces per square yard.

* * * * *